(12) United States Patent
Caldwell (10) Patent No.: US 8,328,141 B2
(45) Date of Patent: Dec. 11, 2012

(54) APPARATUS AND METHOD FOR STOWING SUSPENSION LINES

(76) Inventor: William Caldwell, Mount Pleasant, TX (US)

( * ) Notice: Subject to any disclaimer, the term of this patent is extended or adjusted under 35 U.S.C. 154(b) by 705 days.

(21) Appl. No.: 12/500,339

(22) Filed: Jul. 9, 2009

(65) Prior Publication Data

US 2011/0006161 A1    Jan. 13, 2011

(51) Int. Cl.
*B64D 17/40* (2006.01)
*B64D 17/22* (2006.01)

(52) U.S. Cl. ........................ 244/148; 244/147
(58) Field of Classification Search .................. 244/147, 244/148, 149, 151 R, 151 A, 151 B
See application file for complete search history.

(56) References Cited

U.S. PATENT DOCUMENTS

| | | | |
|---|---|---|---|
| 2,314,433 A | 3/1943 | Tauty | |
| 2,357,805 A * | 9/1944 | Bloxon | 53/377.3 |
| 2,366,764 A | 1/1945 | Wilson | |
| 2,537,152 A | 1/1951 | Moran | |
| 2,683,910 A * | 7/1954 | Moran | 24/433 |
| 2,729,410 A * | 1/1956 | Moran | 244/148 |
| 2,749,066 A | 6/1956 | Barnes et al. | |
| 2,965,944 A * | 12/1960 | Moran | 24/435 |
| 3,417,948 A | 12/1968 | Hoormann | |
| 3,426,813 A * | 2/1969 | Robertson | 81/490 |
| 3,690,604 A | 9/1972 | Guilfoyle | |
| 3,940,095 A | 2/1976 | Asciutto | |
| 4,637,577 A * | 1/1987 | Miseyko et al. | 244/147 |
| 5,253,826 A | 10/1993 | Coltman et al. | |
| 5,263,663 A | 11/1993 | Widgery | |
| 6,302,359 B1 * | 10/2001 | Heflin et al. | 244/149 |
| 8,025,254 B2 * | 9/2011 | Sadeck | 244/151 B |

* cited by examiner

*Primary Examiner* — Joseph W Sanderson
(74) *Attorney, Agent, or Firm* — Carr LLP (57) ABSTRACT

An apparatus for packing a parachute is presented, the apparatus including an expander member extending along a longitudinal axis and having at least a ramp portion that extends in the direction from a first end of the expander member to a second end of the expander member. The ramp portion has an outer surface expanding in perimeter shape from the first end to the second end of the expander member. A channel defined from inner surfaces of the ramp portion extends along the longitudinal axis from an opening at the second end of the expander member towards the first end. The first end of the expander member is configured to engage a substantially unexpanded loop of a stowage device and to expand the perimeter shape of the loop as the loop is moved along the longitudinal axis from the first end to the second end.

4 Claims, 11 Drawing Sheets

APPARATUS AND METHOD FOR STOWING SUSPENSION LINES

BACKGROUND OF THE INVENTION

Field of the Invention

The present invention relates to parachutes and, more particularly, to a tool that may be used in the stowage of parachute suspension lines in packing parachutes.

Parachutes include suspension lines which connect a canopy portion to a harness of the parachute. The suspension lines have a length configured to provide separation between the parachutist attached to the canopy portion and the canopy portion, when the parachute is deployed. To pack a parachute, the entire length of the suspension lines must be stowed with the canopy portion in a confined space such as in a deployment bag or container.

To prevent entanglement of the suspension lines during parachute deployment, the suspension lines must be systematically stowed for a coordinated release from the bag. In many parachute designs, the suspension line stowage system will include stowage devices for binding bundles of suspension line into one or more bights. Each bight may comprise a folded or looped portion in a portion of one or more suspension lines.

The stowage devices may comprise an expandable band member having a loop for surrounding a bundle of suspension line. Stowage devices can include elastic closure loops (as described in U.S. Pat. No. 5,253,826), hollow rings (as described in U.S. Pat. No. 5,263,633), rubber bands, bungee cords, or other types of band members having an expandable loop that may surround a bundle of suspension line and releasably hold the line until desired deployment of the parachute.

The stowage devices may be arranged in a serial pattern on a flap of the bag so that one or more portions of the suspension line are folded in a zig-zag or cascaded configuration. The serial pattern may allow one bundle to be released at a time from its stowage device as tension rides through the suspension lines from the canopy portion to the harness, as the parachute is being deployed. Accordingly, the stowage device must hold a large enough portion of the suspension line so that the bundle is not released too quickly, which may possibly cause suspension line entanglement.

To utilize the stowage devices, the parachutist or a professional rigger must expand a loop of a stowage device, such as a loop of a rubber band, and insert the bundle of suspension line into the loop. In many instances, the rigger must expand each stowage device by first inserting the rigger's finger then progressively expanding the loop with his fingers and hand until the loop has a perimeter large enough to fit over the bundle. Holding the loop at substantially a constant perimeter with his fingers and hand, the rigger then inserts the bundle into the loop and translates the loop over the bundle. The rigger then releases stowage device onto the bundle to engage a length of the bundle sufficient to prevent early release of the bundle during parachute deployment. Thus, through this process the hands of the rigger must bear the compressive forces of the stowage device in order to maintain the stowage device in an expanded state.

The disadvantage to having the rigger use his hands to expand each stowage device is that over the course of several installations the rigger's hands experience wear and tear. For example, one parachute may have at least eight stows, each requiring the stowage device to be installed on a bundle of suspension line. Each installation requires that the rigger expand and hold open the perimeter of the stowage device. The tendency generally is to use stowage devices with increased tension for properly holding the suspension line until deployment. Accordingly, the tension created on the skin, muscles, ligaments of the packer by a series of installations may become painful and may result in stressed ligaments, nerve damage, and carpel tunnel syndrome. Long term practice of manual expansion of stowage device may decrease the abilities of the rigger to continue installing stowage devices.

A hand of a user is typically limited to how wide and how much tension that the hand can oppose over a given length of time and over a given number of consecutive repetitions. Accordingly, manufacturers' stowage devices have accounted for average limitations in hand strength in designing stowage devices by making stowage devices that do not open past a certain threshold of perimeter size and do not apply more than a certain threshold of tension when opened. The consequence of such design is that stowage devices are often not tailored to a specific tension in regards to the size of the bundle of suspension line.

What are needed are improved systems, apparatus, and methods for stowing suspension line.

SUMMARY OF THE INVENTION

An apparatus and method for packing a parachute is presented, the apparatus including an expander member extending along a longitudinal axis and having at least a ramp portion that extends in the direction from a first end of the expander member to a second end of the expander member. The ramp portion has an outer surface that expands in perimeter shape from the first end to the second end of the expander member. A channel is defined from inner surfaces of the ramp portion so that the channel extends along the longitudinal axis from an opening at the second end of the expander member towards the first end. The first end of the expander member is configured to engage a substantially unexpanded loop of a stowage device and to expand the perimeter shape of the loop as the loop is moved along the longitudinal axis from the first end to the second end.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

Figures 1, 21:
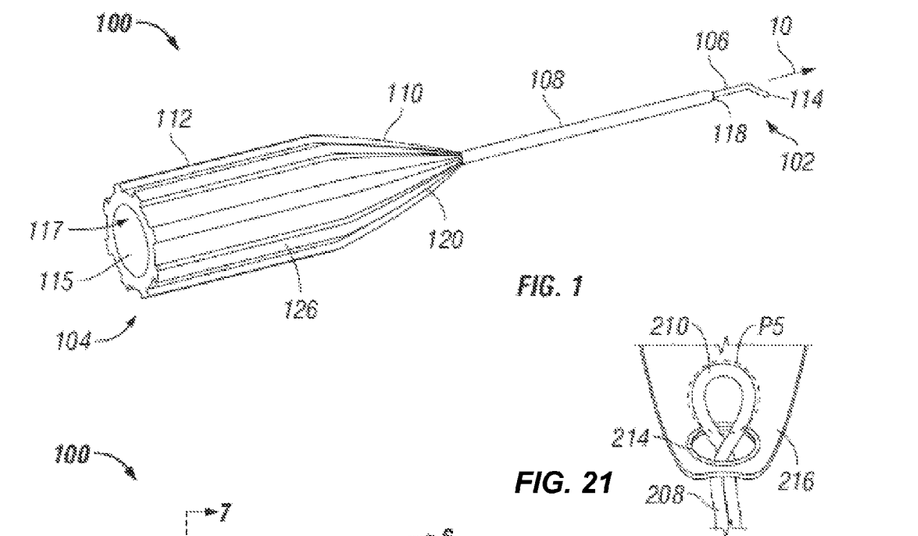
FIG. 1 illustrates a perspective view of a suspension line tool.
FIG. 21 illustrates a band member positioned within a grommet of a flap of a deployment bag.
Figure 2:
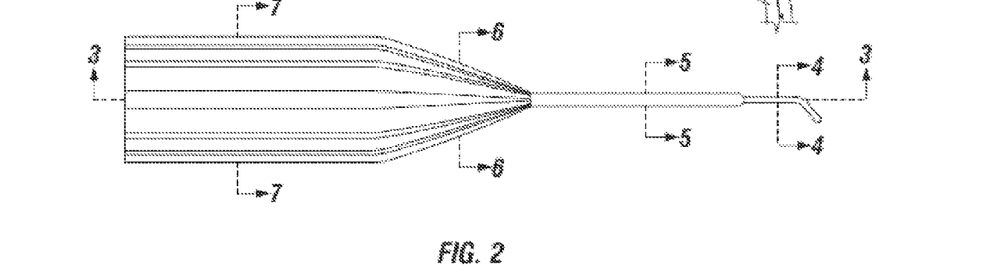
FIG. 2 illustrates a top view of a suspension line tool.

Referring to FIGS. 1 and 2, there are shown a perspective view and a side view of a system, respectively for stowing suspension line. Adjacent to the tool 100 in FIG. 2, there is shown in FIG. 21 a band member 208 positioned within a grommet 214 of a flap 216 of a deployment bag.

The system for stowing suspension line may comprise a suspension line tool 100, which may be configured for manual use by a user. The tool 100 may extend generally along a longitudinal axis 10 from a first end 102 to a second end 104. The tool 100 may extend along the longitudinal axis 10 from a tool tip 106, at the first end 102, to a shaft portion 108 terminating at the second end 104. The shaft portion 108 may couple the tool tip 106 to a ramp portion 110 and a holding member 112 located at the second end 104. The holding member 112 may comprise a cavity 115 having an opening 117.

In some embodiments, the tool 100 may be configured for insertion into a loop of a stowage device (not shown) such as band member 208 having loop 210. The tool 100 may act as an expander member to expand and hold the loop 210 to a desired shape. A suspension line (not shown) may be brought proximal to the tool 100, such as inserted in a cavity 115, and the expanded loop 210 may be released from the hold of the tool 100, and collapsed over the suspension line.

The tool tip 106 may be generally a relatively narrow member, such as a pin, sized for insertion in the loop 210 of the band member 208. In some embodiments the tool tip 106 may configured to insert into a generally unexpanded loop 210. The tool tip 106 may have a cylindrical shape, a flat shape, a cone shape, or any other suitable shape. The tool 100 may extend along the longitudinal axis 10 from a tool tip 106, at the first end 102, to a shaft portion 108, to a ramp portion 110, and to a holding member 112 located at the second end 104.

In some embodiments, the shaft portion 108 may connect the tool tip 106 to the ramp portion 110. The shaft portion 108 may comprise a generally cylindrical elongated shape extending along the longitudinal axis 10. A suspension line bight 220 may be brought proximal to the tool 100, inserted into the cavity 115, where-upon the expanded loop 210 may be released from the hold of the tool 100 and collapsed over the suspension line bight 220.

The ramp portion 110 may comprise a generally cone shape extending along the longitudinal axis 10 from the shaft portion 108. The ramp portion 110 may extend from the shaft portion 108 at an angle so that the outer surface of the ramp portion 110 expands in perimeter shape. It should be understood by persons of ordinary skill that the perimeter shape may comprise other shapes, such as oval, ellipses, polygonal, or convex. Furthermore, the ramp portion 110 may comprise a longitudinal length.

Figure 3:
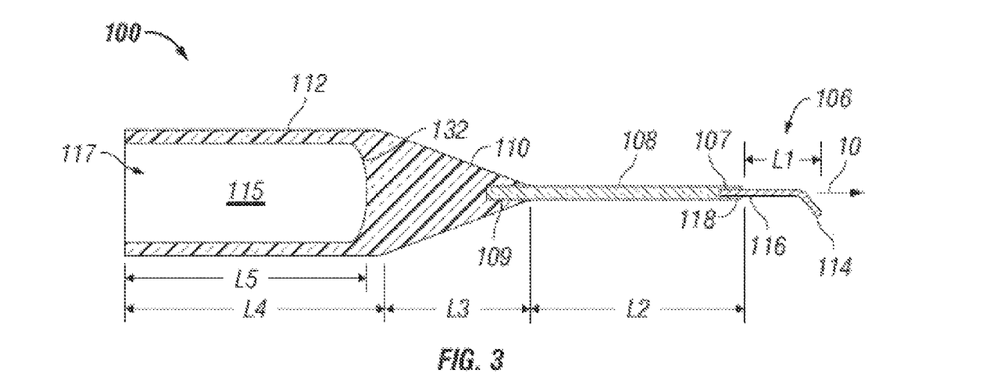
FIG. 3 illustrates a cross-sectional view of the tool 100 taken along line 3-3 shown in FIG. 2.

Referring now to FIG. 3, there is shown a cross-sectional view of the tool 100 taken along line 3-3 shown in FIG. 2. In some embodiments, the tool tip 106 may comprise a bended portion 114. The bended portion 114 may extend from a relatively straight portion 116 of the tool tip 106 substantially at an angle from the longitudinal axis 10. In some embodiments, the angle from the longitudinal axis 10 may comprise an acute angle. The bended portion 114 and the straight portion 116 may be used in combination in engaging and removing stowage devices which have been broken, as described below.

In some embodiments, the tool tip 106 may extend generally along the longitudinal axis 10 through a length L1. The length L1 may be configured to facilitate insertion of the tool tip 106 sufficiently through the loop 210 (shown in FIG. 21) of the stowage device to catch the loop material.

Figure 4:
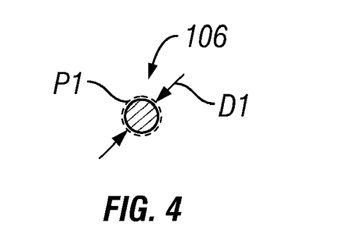
FIG. 4 illustrates a cross-sectional view of the tool tip 106 taken along line 4-4, as shown in FIG. 2.

Referring to FIG. 4, there is shown a cross-sectional view of the tool tip 106 taken along line 4-4, which may be taken as perpendicular to the longitudinal axis 10, as shown in FIG. 2. The cross-sectional profile of the tool tip 106 may comprise a perimeter P1 having a generally circular shape and having a diameter D1 small enough to fit into the loop 210 (shown in FIG. 21) of the stowage device in an unexpanded or uncontracted state. In other embodiments, the tool tip 106 may be required to have a width small enough to wedge or nudge between the knotted portions of the installed stowage device 208 and other structure for removal of the stowage device 208.

Generally, the diameter D1 may comprise a substantially constant value through the length L1, shown in FIG. 3, for ease of insertion of the tool tip 106 into the loop of the stowage device. In some embodiments, the diameter D1 may comprise a value of 3/32 inches (2.38 mm). The tool tip 106 may extend towards the shaft portion. The tool shaft 108 may comprise a tapered portion 118 having a decreasing diameter so that the diameter of the shaft portion 108 is gradually reduced to the diameter of the tool tip 106.

It should be understood by persons of ordinary skill in the art that the tip length L1, tip diameter D1, and perimeter shape of the tool tip 106 may be varied and have different configurations. For instance, the tool tip 106 may comprise a generally blunt conical member having a tapered shape for introducing the tool tip 106 into the loop 210 of the stowage device. Or the tool tip 106 may comprise a partially flattened shape for insertion of the tool tip 106 between the overlapping portions of a knot in the stowage device 208 used to secure the stowage device 208 to the deployment bag. In other embodiments, the tool tip 106 may be required to have a width small enough to wedge or nudge between the knotted portions of the installed stowage device 208 to facilitate removal of the stowage device 208 from its holder.

Referring to FIG. 3, the shaft portion may extend from the tool tip 106 substantially along the longitudinal axis 10 about a shaft length L2. The shaft length L2 may be configured provide a first gripping surface for a user to hold or grip the tool 100 while the stowage device is advanced from the tool tip 106 to the ramp portion 110. In other embodiments, the shaft portion 108 may be used to pull the stowage device, such as through grommet 214 (shown in FIG. 21), and lengthen an expandable portion of the stowage device.

Figure 5:
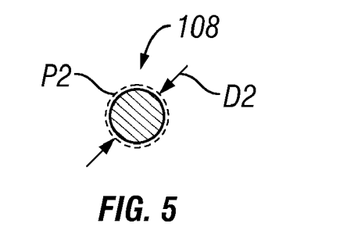
FIG. 5 illustrates a cross-sectional view of the shaft portion 108 taken along line 5-5, as shown in FIG. 2.

Referring to FIG. 5, there is shown a cross-sectional view of the shaft portion 108 taken along line 5-5, which may be taken as perpendicular to the longitudinal axis 10, as shown in FIG. 2. The cross-sectional profile of the shaft portion 108 may comprise a perimeter P2 having substantially a generally circular shape having a shaft diameter D2.

Generally, the shaft diameter D2 may comprise a substantially constant value through the shaft length L2 for moving the stowage device from the tool tip 106 to the ramp portion 110. Generally, the shaft portion 108 may comprise a generally smooth and even outer surface so as not to interfere with movement of the stowage device across the shaft portion 108.

It should be understood by persons of ordinary skill in the art that the shape of the perimeter P2 may comprise an oval, ellipse, polygonal, or convex shapes. The shaft portion 108 may also be partially hollow or solid. Also, the shaft portion may have a shaft diameter D2 or thickness that varies from or is equal to the tool tip diameter D1. In at least one embodiment, the shaft diameter D2 may have a value of ⅜ inches (8.25 mm).

Referring to FIG. 3, the ramp portion 110 may extend from the shaft portion 108 substantially along the longitudinal axis 10 about a ramp length L3. The ramp portion 110 may comprise an outer surface forming an expanding shape centered generally about the longitudinal axis 10, such as a cone shape shown in FIG. 1, which enlarges the cross-sectional perimeter of the outer surface of the tool 100 from the perimeter shape of the cross-section of the shaft portion 108, shown in FIG. 5, to the perimeter shape of the cross-section of the holding member 112, shown in FIG. 7.

Figure 6:
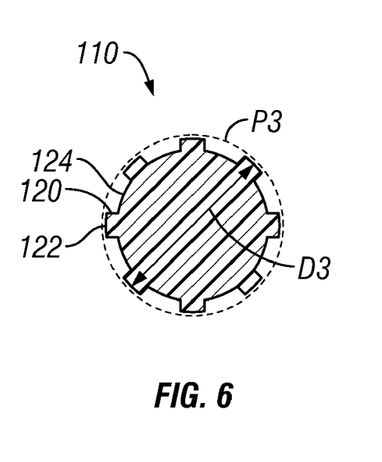
FIG. 6 illustrates a cross-sectional view of the ramp portion 110 taken along line 6-6, as shown in FIG. 2.

Referring to FIG. 6, there is shown a cross-sectional view of the ramp portion 110 taken along line 6-6, which may be taken as perpendicular to the longitudinal axis 10, as shown in FIG. 2. The cross-sectional profile of the ramp portion 110 may comprise a perimeter P3 having generally a substantially circular shape having a ramp diameter D3. The cross-section shown in FIG. 6 is taken at approximately midway between the shaft portion 108 and the holding member 112 to show the sloping of the outer surface of the ramp portion and the relative increase in the ramp diameter D3 compared to the shaft diameter D2.

The outer surface of the ramp portion 110 may provide a surface for expanding the general shape of the loop 210 (FIG. 21) of the band member 208 (FIG. 21) to a desired shape, diameter, or perimeter. The outer surface may comprise a fluted surface comprising one or more flute members 120 extending along the outer surface of the ramp portion 110 generally parallel to the longitudinal axis 10, as shown in FIG. 6. The flute members 120 may each comprise a top contact surface 122 for engaging the band member 208. Between each flute member 120 there may be a gap 124, where outer surface of the ramp portion 110 dips away from the contact surface 122 and towards a center of the tool 100.

The flute members 120 may limit a contact surface area of the outer surface of the ramp portion 110. The contact surface area makes contact with the band member 208 (shown in FIG. 21) as it passes over the ramp portion. Decreasing the contact surface area may decrease the amount of friction and the amount of force required to slide the loop 210 (shown in FIG. 21) of the stowage device up the ramp portion 110. The size of the flute members 120, including a width of the top contact surface 122 and the width of the gap 124 may be varied to increase or decrease the contact surface area.

It should be understood by persons of ordinary skill in the art that the ramp portion 110 may comprise shape of the perimeter P3 including oval, ellipse, polygonal, and convex shapes. The ramp portion 110 may also be at least partially hollow or solid. In at least one embodiment, the range of cone diameter D3 may begin at a value of ⅜ inch (8.25 mm) at the shaft portion 108 and terminate at a value of 2 inches (50.8 mm) at the holding member 112.

Referring to FIG. 3, the holding member 112 may comprise an outer surface forming generally a cylindrical shape. The holding member 112 may extend substantially along and centered about the longitudinal axis 10 about a holding member length L4. The length L4 may be configured to provide a gripping surface for the user to manipulate the tool 100 and position the stowage device on the tool 100.

The cylindrical shape of the holding member 112 may be configured for maintaining the loop 210 of the stowage device 208 at a desired shape, circumference, or perimeter without requiring the user to use his own hand or other tool to maintain the shape of the loop 210. This may allow the user to bring the suspension line bight 220 proximal to the cavity 115 of the tool 100 and install the stowage device 208 onto the suspension line bight 220. In some embodiments, the user may be freed to address other steps in the stowage process, making his efforts more efficient. Also, use of the holding member 112 saves the user from the wear on his hands caused by the repeated use of his hands to expand and hold open the stowage devices 208.

Figure 7:
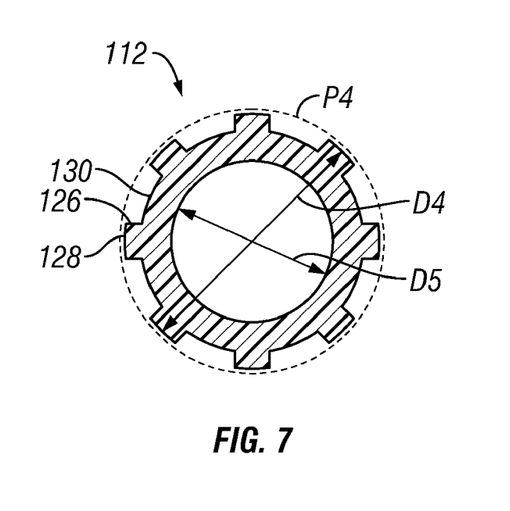
FIG. 7 illustrates a cross-sectional view of the holding member 112 taken along line 7-7, as shown in FIG. 2.

Referring to FIG. 7, there is shown a cross-sectional view of the holding member 112 taken along line 7-7, which may be taken as perpendicular to the longitudinal axis 10, as shown in FIG. 2. The cross-sectional profile of the holding member 112 may comprise a perimeter P4 having substantially a generally circular shape and having a holding member diameter D4.

The outer surface of the holding member 112 provides a surface for expanding the general shape of the loop 210 (shown in FIG. 21) of the stowage device to a desired shape, diameter, or perimeter. As shown in FIGS. 1 and 7, the outer surface may comprise a fluted surface comprising one or more second flute members 126 extending along the outer surface of the holding member 112 generally parallel to the longitudinal axis 10. The second flute members 126 may each comprise a second contact surface 128 for engaging the band member 208. Between each second flute member 126 there may be a second gap 130, where the outer surface of the holding member 112 dips away from the contact surface 128.

In some embodiments, the holding member 112 should hold its shape sufficiently to allow stowage devices (such as band member 208) of varying tensions to be held on the outer surface of the holding member 112. The holding member 112 may be constructed to allow stowage band tensions to exceed the limits of what a human hand may hold. This capability may allow parachute manufacturers to use specific size stowage devices on bights of suspension lines that hold the deployment bag closed, on bights of cascaded suspension lines, and on the bights of suspension line below the cascades. Placement of these stowage devices of varying tensions may result in even release of the bights of suspension lines during deployment which reduces the chance of line twists on the deployed parachute.

Referring to FIG. 1 and FIG. 7, the flute members 126 may decrease a contact surface area of the outer surface of the holding member 112 which makes contact with the band member 208 as the band member 208 is passed over the holding member 112. Decreasing the contact surface area may decrease the amount of friction and, accordingly, the amount of force required to slide and expand the loop 210 of the band member 208 along the holding member 112.

It should be understood by persons of ordinary skill in the art that the perimeter P4 of the holding member 112 may comprise a cross-sectional shape including oval, ellipse, polygonal, and convex shapes. The holding member 112 may also be at least partially hollow or solid. In at least one embodiment, the holding member diameter D4 may comprise a value of 2 inches (50.8 mm). The holding member diameter D4 may be varied according to how thick the suspension line that is intended to be stowed is, and how thick a bundle of suspension line may be.

In the embodiment shown in FIG. 3, the cavity 115 in the holding member 112 may comprise a generally cylindrical channel extending from the opening 117 along the longitudinal axis 10 into the holding member 112 and terminating at wall 132. The cavity 115 may be configured in size and shape to accept a bight of suspension line 220.

The cavity 115 may comprise a cavity depth L5 extending from the opening 117 to the wall 132. The cavity depth L5 may be configured to position the band member loop 210 at a calibrated length of suspension line bight 220; so that, the band member loop 210 may be collapsed onto the suspension line bight 220 at the pre-determined length. Generally, it may be advantageous to provide consistent lengths of suspension line bights 220 extending through the band member loops 210. This practice will result in consistent release times of the bights 220 during the deployment of the parachute. Even release times of the bights 220 have been proven to reduce the occurrence of line entanglement and line twists.

Referring now to FIG. 7, the cavity 115 may further comprise a cavity diameter D5. The cavity diameter may be sized for accommodating a girth or width of a bight 220 of suspension line. In some embodiments, a larger cavity diameter D5 may be provided to accommodate suspension line that is thicker and would require a wider space in the cavity 115.

It should be understood by persons of ordinary skill that the dimensions and shape of the cavity 115 may be configured differently from the embodiments shown. For instance, the cavity depth L5 may be increased to accommodate a longer bight 220. The cavity diameter D5 may be increased to accommodate a thicker bight 220. Also, the shape of the cavity 115 may be configured be as a prism having a polygonal cross-section.

In certain embodiments, the tool 100 may be manufactured from nylon molded to conform to the shape and size disclosed herein. It will be understood by persons of ordinary skill in the art that other materials that may be molded, machined or carved may be used, including but not limited to wood, high density polyethylene, carbon fiber, plastic, fiberglass, styrene, and metals, such as stainless steel and aluminum.

In the embodiment shown in FIGS. 1-7, the holding member 112 is formed from nylon. The shaft portion 108 may be machined from stainless steel. The shaft portion 108 may comprise an embedded portion 109, which extends into a portion of the holding member 112, in order to couple the shaft portion 108 to the holding member 112. The shaft portion 106 may be machined from stainless steel. The tool tip 106 may comprise an embedded portion 107, which extends into a portion of the shaft portion 108, in order to couple the tool tip 106 to the shaft portion 108.

In some embodiments, the tool 100 may comprise the following dimensions. The overall length of the tool 100 may comprise the sum of the tip length L1, plus the shaft length L2, plus the ramp length L3, plus the holding member length L4. In certain embodiments, dimensions L1-L4 may have the following values: L1, ⅞ inch (2.2 cm); L2, 4¾ inches (12.1 cm); L3, 3 inches (7.6 cm); L4, 3⅛ inches (7.9 cm). The diameters of the portions of the tool 100 may comprise the tip diameter D1, the shaft diameter D2, the ramp diameter D3 which may comprise a range of ⅜ inch (8.25 mm) to 2 inches (50.8 mm), and the holding member diameter D4. In certain embodiments, dimensions D1, D2, and D4 may have the following values: D1, ³⁄₃₂ inch (2.38 mm); D2, ⅜ inch (8.25 mm); D4, 2 inches (50.8 mm). The cavity 115 may comprise a cavity depth L5=2.5 inches (65 mm) and a cavity diameter D5=1.5 inches (39 mm).

Referring now to FIGS. 8-13, there is shown a method for stowing suspension lines of a parachute. In the embodiment shown in FIG. 8, a suspension line tool 100 may be provided for packing suspension lines 204 that couple a canopy 206 to a harness (not shown). In some embodiments, the suspension line tool 100 shown and described in FIGS. 1-7 may be used to accomplish one or more of the operations of the method. A user may begin by inserting the tool tip 106 into the loop 210 of the band member 208.

Figure 8:
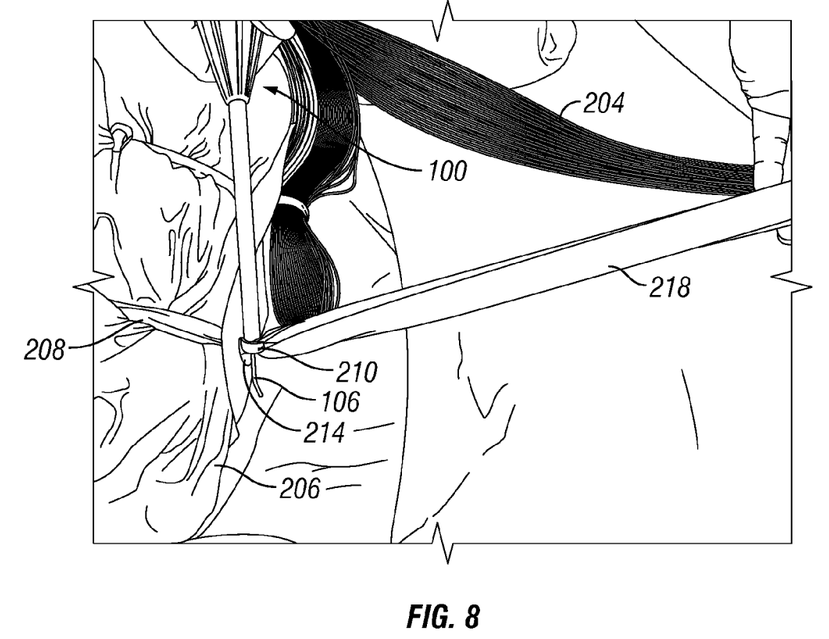
FIGS. 8-15 illustrate a method for stowing suspension line.

In some embodiments, the band member 208 may comprise a rubber band that is tied to a first flap 212 of a deployment bag and strung through a grommet 214 passing through an opposing second flap 216 of the bag. The band member may be configured to draw the first flap 212 towards the second flap 216 and over the folded canopy 206. The loop 210 may extend from the grommet 214. In some embodiments, the loop 210 may be pulled by the user using a strap 218 that is strung through the loop 210, as shown in FIGS. 8 and 9.

The suspension line 204 may be looped into a bight 220 at or near the grommet 214. The bight 220 may be positioned within the loop 210 so that the band member 208 retains the suspension line bight 220 at the grommet 214. The relative size of the bight 220 compared to the grommet 214 may prevent the loop 210 from passing through the grommet 214 and, thus, prevents the flaps (212 and 216) from releasing the canopy 206 until the suspension line 220 is released from the loop 210 during parachute deployment.

Figure 9:
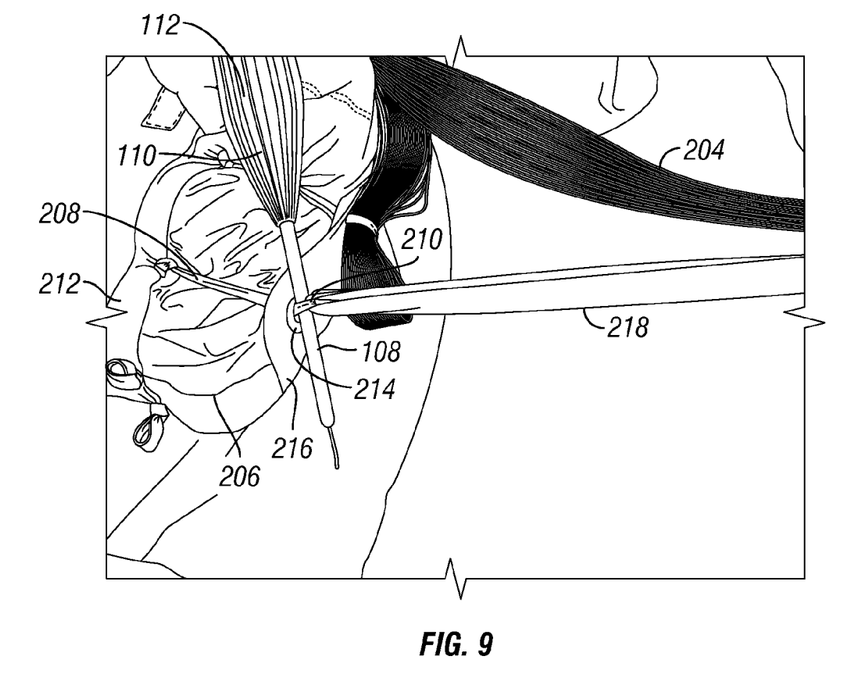

Referring now to FIG. 9, the tool 100 may be further pushed through the loop 210 by using the holding member 112 as a handle. The shaft portion 108 may be pushed through the loop 210 so that the loop 210 is brought near or to the ramp portion 110.

In other embodiments, the shaft portion 108 may itself be used as a handle (not depicted) to further urge the first flap 212 towards the second flap 216. Reducing the separation between the flaps 212 and 216 may further compress the canopy 206 to reduce its overall size and volume.

Figure 10:
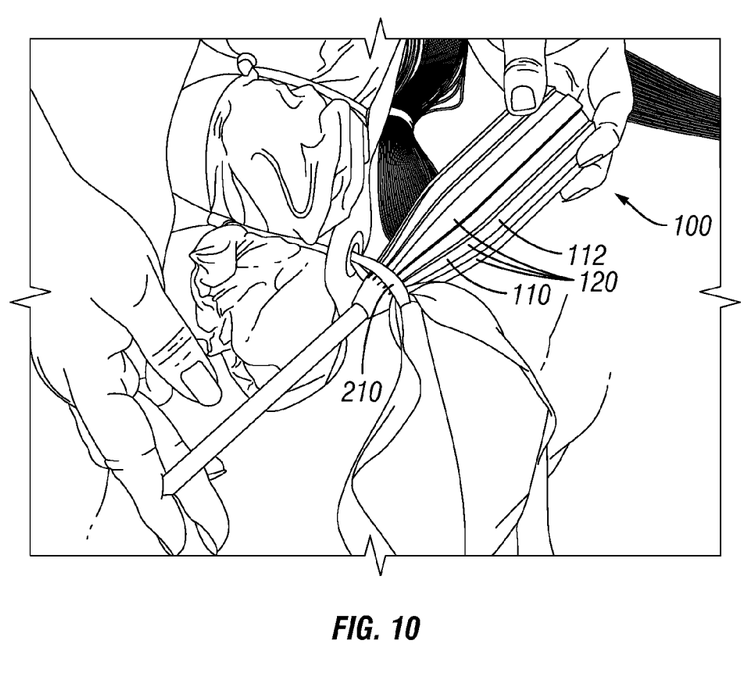

Referring now to FIG. 10, the tool 100 may be used to expand the loop perimeter P5 (shown in FIG. 21) of the loop 210. The user may move the loop 210 up the ramp portion 110. The ramp portion 110 may comprise an increasing outer perimeter P3, as shown in FIG. 6, as it extends towards the holding member 112. Thus, as the loop 210 is moved toward the holding member 112, the size of the loop perimeter P5 substantially approaches the size and shape of the perimeter P4 of the outer surface of the holding member 112.

In some embodiments, the ramp portion 110 may comprise one or more first flute members 120 extending along the outer surface of the ramp portion 110 in generally the longitudinal direction. The first flute members 120 may comprise gaps 124, as shown in FIG. 6, or grooves between each first flute member 120. The friction and overall force required to translate the loop 210 up the ramp portion 110 may be decreased by the decreased amount of contact between inner surfaces of the loop 210 and the outer surface of the ramp portion 110.

Figure 11:
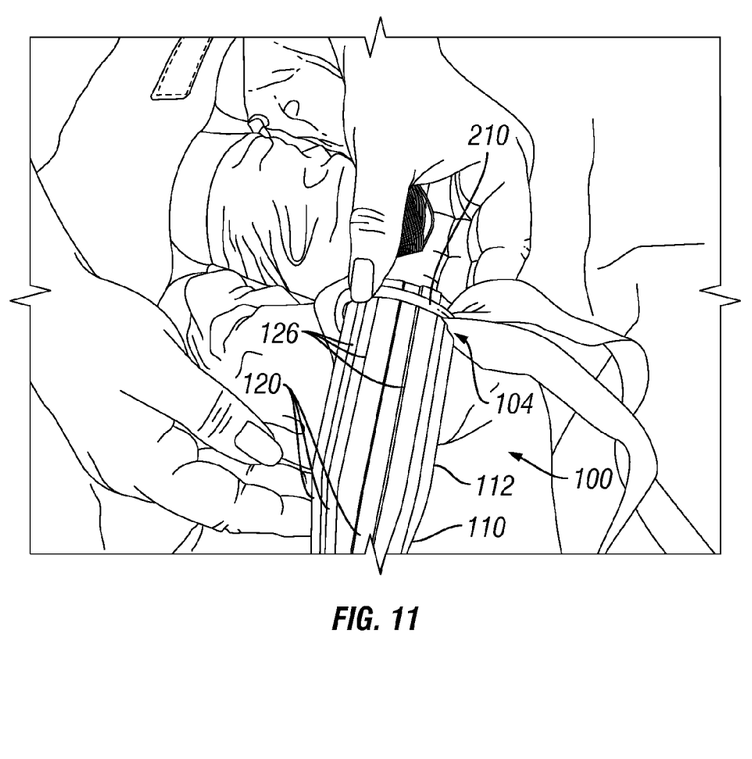

As shown in FIG. 11, the loop 210 may be moved along the outer surface of the holding member 112 towards the second end 104 of the tool 100. The user may position the loop 210 at an edge of the holding member 112 to prepare the loop 210 to be disengaged from the tool 100.

In some embodiments, the holding member 112 may comprise one or more second flute members 126 extending along the outer surface of the holding member 112 in generally the longitudinal direction. The second flute members 126 may comprise gaps 130, as shown in FIG. 7, or grooves between each second flute member 126. In some embodiments, the second flute members 126 may extend continuously from the first flute members 120 of the ramp portion 110. The friction and overall force required to translate the loop 210 along the outer surface of the holding member 112 may be decreased by the decreased amount of contact between inner surfaces of the loop 210 and the outer surface of the holding member 112.

Figure 12:
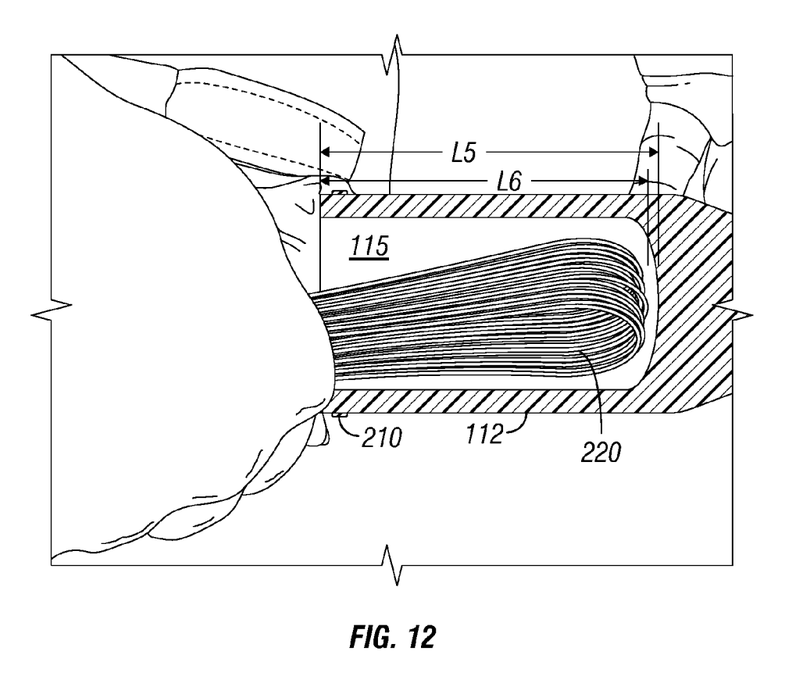

Turning now to FIG. 12, there is shown a cross-sectional view of the tool 100, taken generally along the line 3-3, as shown in FIG. 2, wherein a portion of suspension line 204, such as bight 220 has been inserted into the holding member 112. The user may insert the bight 220 into cavity 115 for stowing purposes, including binding the portion of suspension line 204 to allow for a coordinated release of the suspension line 204 and canopy 206 (not shown) during parachute deployment.

In some embodiments, a length L6 of the bight and position of the loop 210 of the band member 208 may be based in part on the cavity depth L5 of the cavity 115. A user may position the bight 220 either on the outside or within the cavity 115 to use the tool as a general measure for the length L6 of the bight. Generally, the length L6 of the bight 220 may be varied, along with the number of stowage devices applied to the suspension line, to obtain an optimum and timed release of the suspension line 204.

Figure 13:
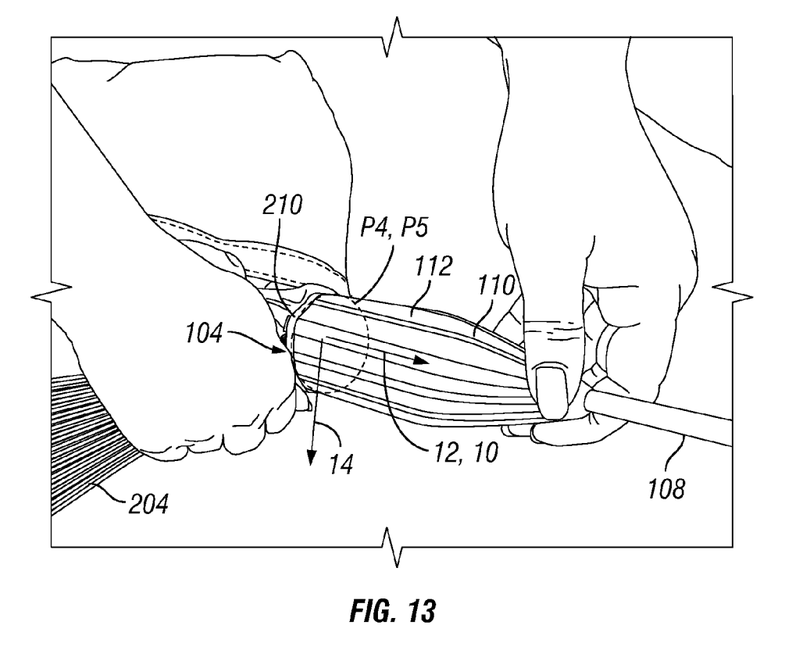
Figure 14:
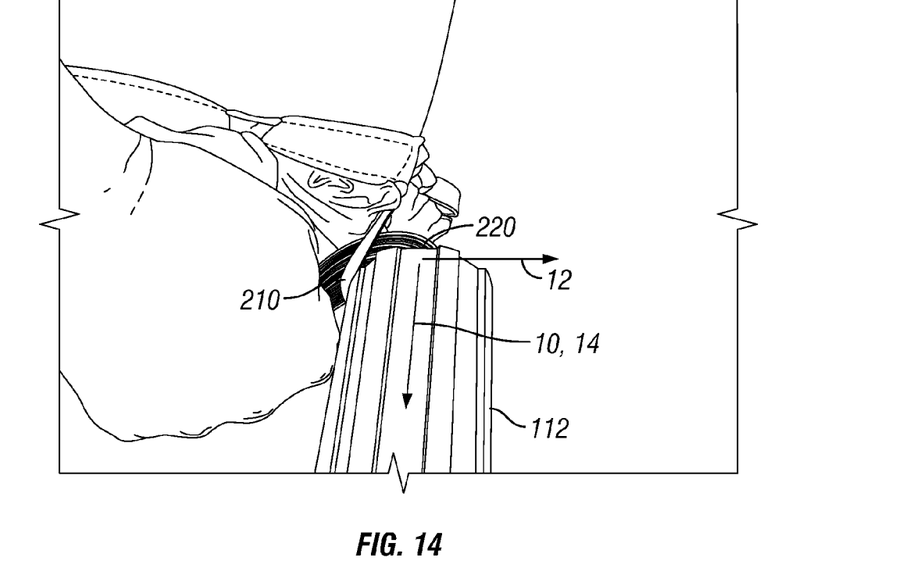

Turning now to FIGS. 13 and 14, the user may use the shaft portion 108 and the ramp portion 110 as a handle. In some embodiments, the user may hold the shaft portion 108 to keep the longitudinal axis 10 of the tool 100 aligned with a stowage device axis 12. The stowage device axis 12 may comprise an axis normal to the plane in which the loop perimeter P5 of the loop 210 expands. It may be advantageous in some embodiments to keep these axes 10, 12 aligned during loop expansion to reduce tension forces, and, therefore, the friction forces required to advance the loop 210 along the ramp portion 110 and holding member 112.

The loop 210 may be transferred from the holding member 112 to the bight 220, which is positioned in the holding member 112. The user may continue to advance the loop 210 until it slides off the edge of the holding member 112 at the second end 104. The loop 210 may contract once it begins to disengage from the holding member 112. The user may guide the loop 210 over and onto the bight 220.

As shown in FIG. 14, the user may pivot the shaft portion 108 to disengage the loop 210 from the holding member 112, and transfer the loop 210 to the bight 220. The user may pivot the shaft portion 108 so that the longitudinal axis 10 is offset from the stowage device axis 12, and aligned with an offset axis 14, as shown in FIG. 14. Pivoting the shaft portion 108 may cause a portion of the loop 210 to slide off of the holding member 112. Increasing an offset angle from the stowage device axis to the longitudinal axis 10 may increase the amount of the loop 210 that slides off, until, at a threshold, the entire loop contracts onto the bight 220.

Figure 15:
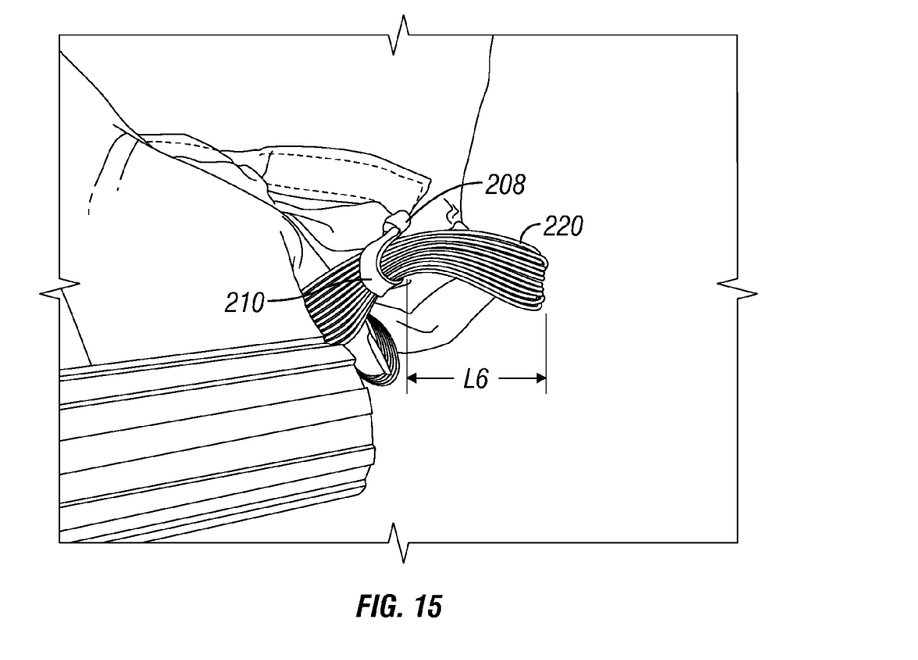

As shown in FIG. 15, the bight 220 may be left with the loop 210 of the band member 208 positioned at the length L6 from a folded portion of the bight 220. This process may be repeated for other bight portions of the suspension line 204 in order to complete stowage of the parachute.

Figure 16:
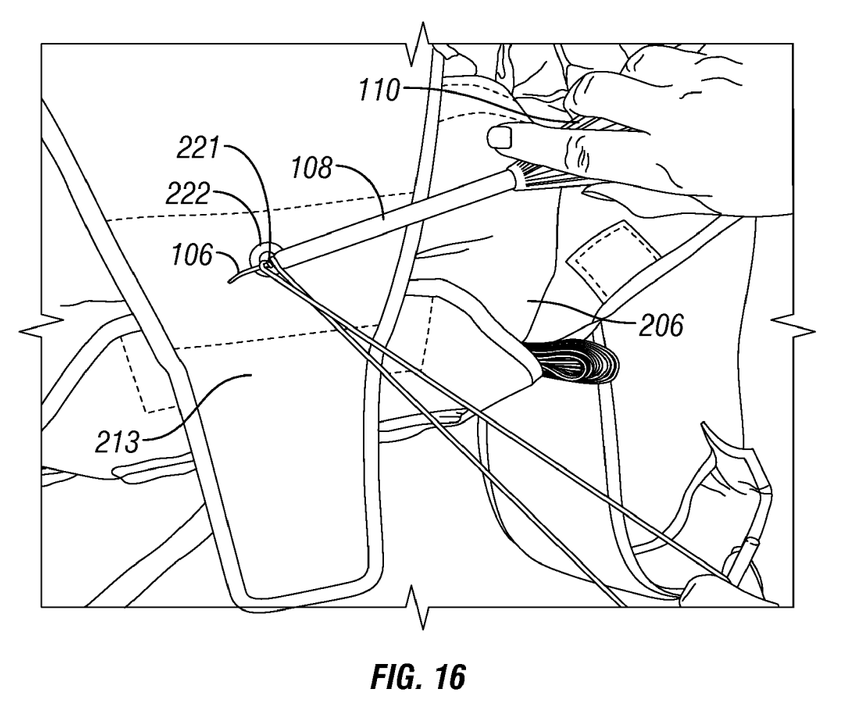
FIG. 16 illustrates a method for using the suspension line tool as a temporary pin.

Turning now to FIG. 16, there is shown an alternative use of the suspension line tool 100. As part of the stowage process, the canopy 206 is secured by one or more flaps 213. The flaps 213 are secured by a closing pin (not shown) inserted into a closing loop 221 which passes sequentially through the grommet 222 located in each flap 213. Generally, four flaps 213 may be used to retain the canopy in the harness. During parachute packing, the flaps 213 may be closed sequentially, according to the manufacturers' recommendations. First, a pull up cord may be drawn through a closing loop 221. The pull up cord may be then drawn through a flap grommet 222 and force is applied to the pull up cord to draw the closing loop 221 through the flap grommet 222. The tip 106 of the tool 100 may be used to temporarily engage the closing loop 221, while the pull up cord and closing loop 221 are drawn through the next grommet 222. FIG. 16 shows the tip 106 in its temporary engagement with the closing loop 221. The tip 106 may be then disengaged from the closing loop 221 and re-engaged when the closing loop 221 is passed through the next grommet 222. This procedure may be repeated until the closing loop 221 is passed through the last grommet 222 and the closing pin is used to secure the closing loop. In some embodiments, the tool tip 106 of the tool 100 may be inserted and held at approximately the parachute grommets 222.

In some embodiments, the user may use the ramp portion 110 and the holding member 112 as a handle to maneuver and position the tool tip 106.

Turning now to FIGS. 17-20, there are shown operations performed in removing stowage devices 230. In some circumstances, it may become necessary or desirable for a user to remove a stowage device 230 that is tied to a flap 212. The stowage device 230 may be torn, broken partially, or old. In some cases, the stowage device 230 remains contracted in a knot and may require that a portion of the stowage device 230 be pulled, unentangled, expanded, or untied from the flap 212.

Figure 17:
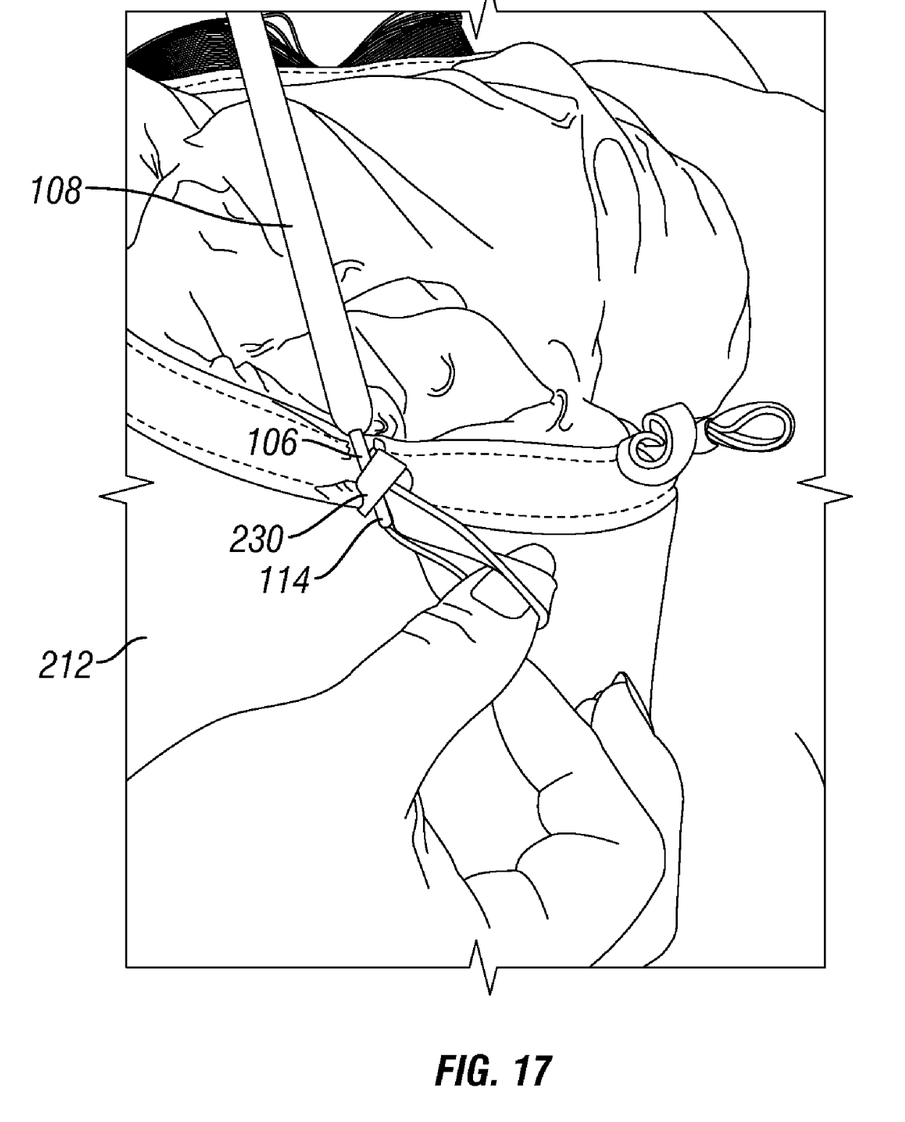
FIGS. 17-20 illustrate a method for removal of a broken stowage device.

The bended portion 114 of the tool tip 106 may be inserted into an overlapping portion of the knot that binds the stowage device 230 to the flap 212. The user may pivot the shaft portion 108 and advance the bended portion 114 into the crevice. The pivoting of the shaft portion 108 may provide a wedging action that pushes and pulls the stowage device 230.

Figure 18:
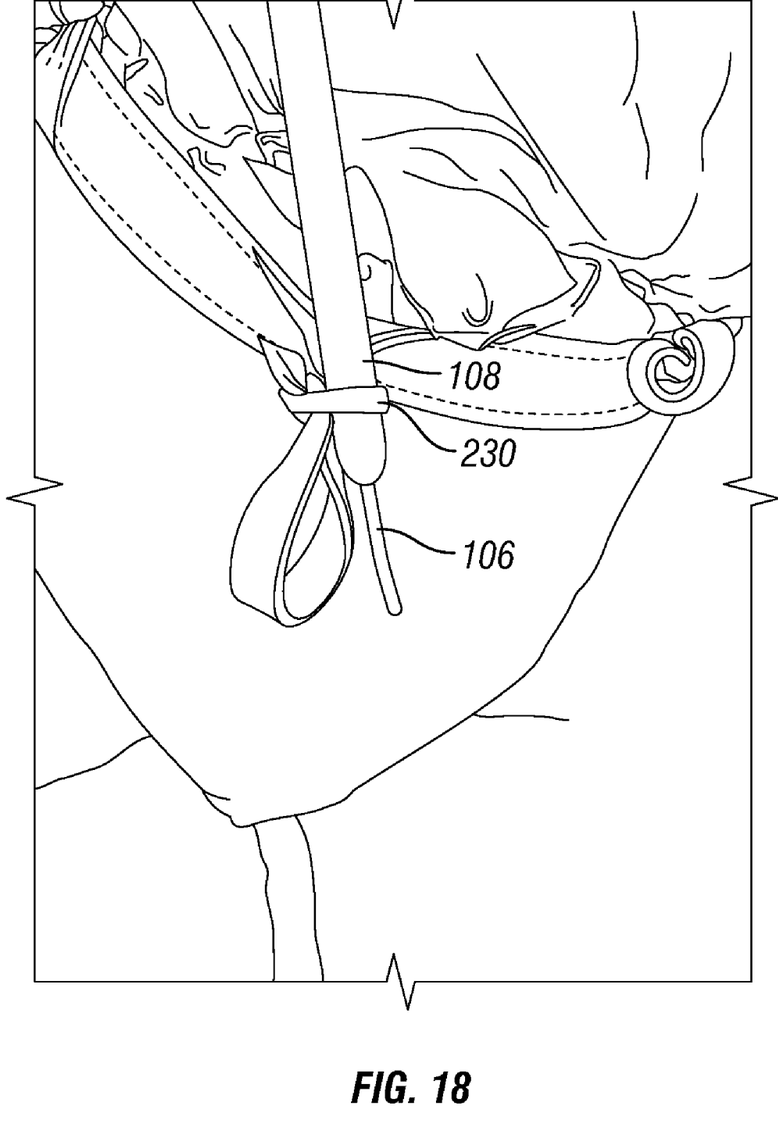
Figure 19:
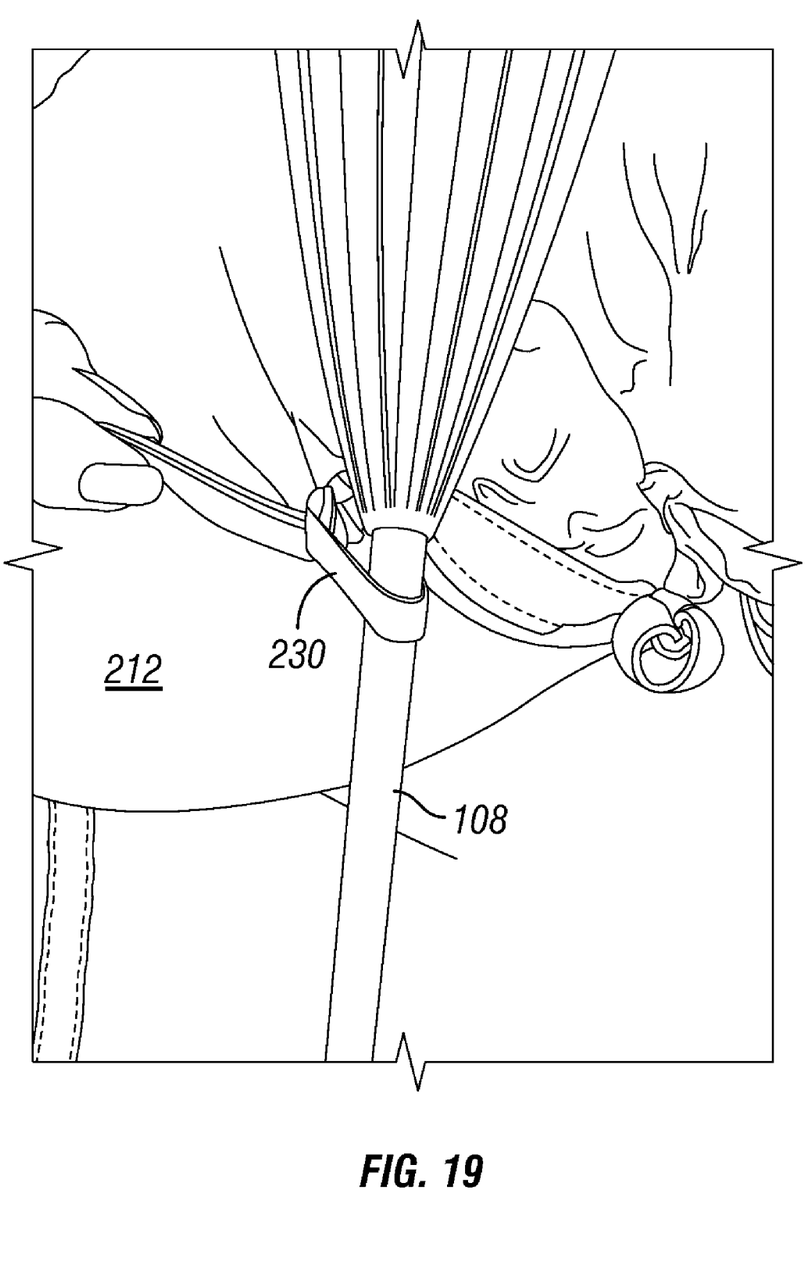
Figure 20:
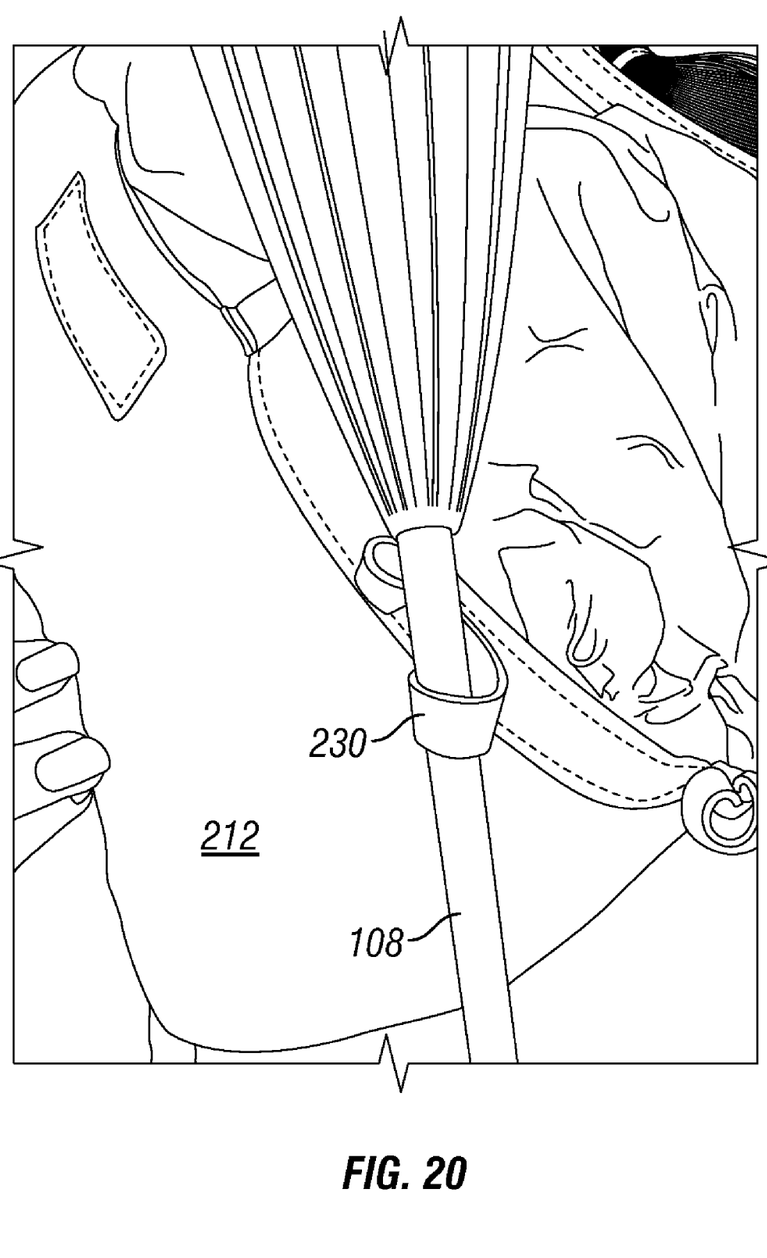

Referring now to FIGS. 18 and 19, the user may rotate and pivot the shaft portion 108 and advance the tool tip 106 and shaft 108 into the knot until the knot loosens and allows the stowage device 230 to disengage from its holder on the flap 212. As shown in FIG. 20, the knot of the stowage device 230 may become disentangled, allowing the user to pull the stowage device away from the flap 212.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for stowing suspension line to pack a parachute, the method comprising:
   providing a suspension line tool having an expander member extending along a longitudinal axis from a first end to a second end of the suspension line tool for positioning an expandable band member around a band receiving member;
   inserting a first portion of the first end of the suspension line tool into a loop of the expandable band member;
   expanding a perimeter of the loop by moving the loop along a ramp portion of the suspension line tool, wherein the ramp portion has a first outer surface expanding in perimeter shape along the longitudinal axis from generally the first end towards the second end;

inserting the band receiving member in a channel defined by inner surfaces of the expander member and extending along the longitudinal axis from an opening in the expander member at the second end toward the first end; and transferring the loop onto the band receiving member by disengaging the loop from the second end of the expander member so that the loop contracts around a portion of the band receiving member.

2. The method of claim 1, further comprising:

holding the loop perimeter in an expanded condition by transferring the loop from the ramp portion to a holding portion of the tool, wherein the holding portion comprises a second outer surface extending at a substantially constant holding perimeter shape along the longitudinal axis from the second end to the ramp portion.

3. The method of claim 2, further comprising:

moving the loop along a length of the holding portion toward the opening at the second end of the expander member.

4. The method of claim 3, further comprising:

translating the loop from the first portion of the first end along a shaft portion of the expander member, wherein the shaft portion extends along the longitudinal axis from generally the first end towards the ramp portion, and wherein the first portion comprises a pin member.

* * * * *